(12) United States Patent
Ratcliffe et al.

(10) Patent No.: US 9,872,328 B2
(45) Date of Patent: Jan. 16, 2018

(54) UPDATING CONNECTIVITY WITH A COMMUNICATION NETWORK AND METHODS THEREOF

(71) Applicant: AT&T INTELLECTUAL PROPERTY I, L.P., Atlanta, GA (US)

(72) Inventors: Mark A. Ratcliffe, Oakhurst, NJ (US); Chaoxin Qiu, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/370,751

(22) Filed: Dec. 6, 2016

(65) Prior Publication Data

US 2017/0086249 A1    Mar. 23, 2017

Related U.S. Application Data

(62) Division of application No. 14/552,600, filed on Nov. 25, 2014.

(51) Int. Cl.
| | |
|---|---|
| *H04W 4/00* | (2009.01) |
| *H04W 76/02* | (2009.01) |
| *H04W 76/04* | (2009.01) |
| *H04W 76/06* | (2009.01) |
| H04W 8/04 | (2009.01) |
| H04W 8/26 | (2009.01) |

(52) U.S. Cl.
CPC ....... *H04W 76/028* (2013.01); *H04W 76/041* (2013.01); *H04W 76/062* (2013.01); *H04W 76/068* (2013.01); H04W 8/04 (2013.01); H04W 8/26 (2013.01)

(58) Field of Classification Search
CPC ... H04W 76/046; H04W 76/06; H04W 76/02; H04W 76/068; H04W 76/022; H04W 76/028; H04W 8/04; H04W 28/18; H04W 36/08; H04W 76/025; H04W 88/02; H04W 88/08; H04W 28/00; H04W 28/0289; H04W 28/08
See application file for complete search history.

(56) References Cited

U.S. PATENT DOCUMENTS

| | | |
|---|---|---|
| 8,224,330 B2 | 7/2012 | Ahmed |
| 8,495,226 B2 | 7/2013 | Lau |
| 8,804,530 B2 | 8/2014 | Hamel et al. |
| 2009/0176496 A1 | 7/2009 | Li et al. |

(Continued)

OTHER PUBLICATIONS

"VoLTE Service Description and Implementation Guidelines", Version 1.1, GSM Association, Official Document FCM.01, Mar. 26, 2014, 121 pages.

*Primary Examiner* — Kwasi Karikari
(74) *Attorney, Agent, or Firm* — Guntin & Gust, PLC; Ralph Trementozzi

(57) ABSTRACT

Aspects of the subject disclosure may include, for example, a system that detects a request to reattach to a communication network to update a registration between a wireless communication system and the communication network while the wireless communication system is connected to a session border controller of the communication network. The system delays a release of bearer communications with the communication network responsive to the request to reattach to the communication network not being urgent. Other embodiments are disclosed.

20 Claims, 8 Drawing Sheets

(56) References Cited

U.S. PATENT DOCUMENTS

| | | | |
|---|---|---|---|
| 2011/0053588 A1* | 3/2011 | Al-Khudairi | H04W 36/30 455/424 |
| 2012/0191842 A1 | 7/2012 | Hu et al. | |
| 2013/0121207 A1 | 5/2013 | Parker | |
| 2013/0163463 A1 | 6/2013 | Grayson et al. | |
| 2013/0231080 A1 | 9/2013 | Cheuk et al. | |
| 2013/0336286 A1 | 12/2013 | Anschutz | |
| 2013/0343295 A1 | 12/2013 | Deo | |
| 2014/0043993 A1 | 2/2014 | Sirotkin et al. | |
| 2014/0169269 A1 | 6/2014 | Salot et al. | |
| 2014/0173712 A1 | 6/2014 | Ferdinand et al. | |
| 2016/0150393 A1 | 5/2016 | Ratcliffe et al. | |

* cited by examiner

600

700

UPDATING CONNECTIVITY WITH A
COMMUNICATION NETWORK AND
METHODS THEREOF

CROSS-REFERENCE TO RELATED
APPLICATION

This application is a Divisional of and claims priority U.S. patent application Ser. No. 14/552,600 filed Nov. 25, 2014 by Ratcliffe et al., entitled "Updating Connectivity with a Communication Network and Methods Thereof." All sections of the aforementioned application are incorporated herein by reference in its entirety.

FIELD OF THE DISCLOSURE

The subject disclosure relates to updating connectivity with a communication network and methods thereof.

BACKGROUND

As demand for communication services grows, service providers generally add new communication nodes (e.g., routers, base stations, etc.), upgrade existing communication nodes, or in some instances, construct a new network that replaces a prior generation of another network. The evolution of a communication network can be dynamic and frequent.

BRIEF DESCRIPTION OF THE DRAWINGS

Reference will now be made to the accompanying drawings, which are not necessarily drawn to scale, and wherein.

DETAILED DESCRIPTION

Figure 1:
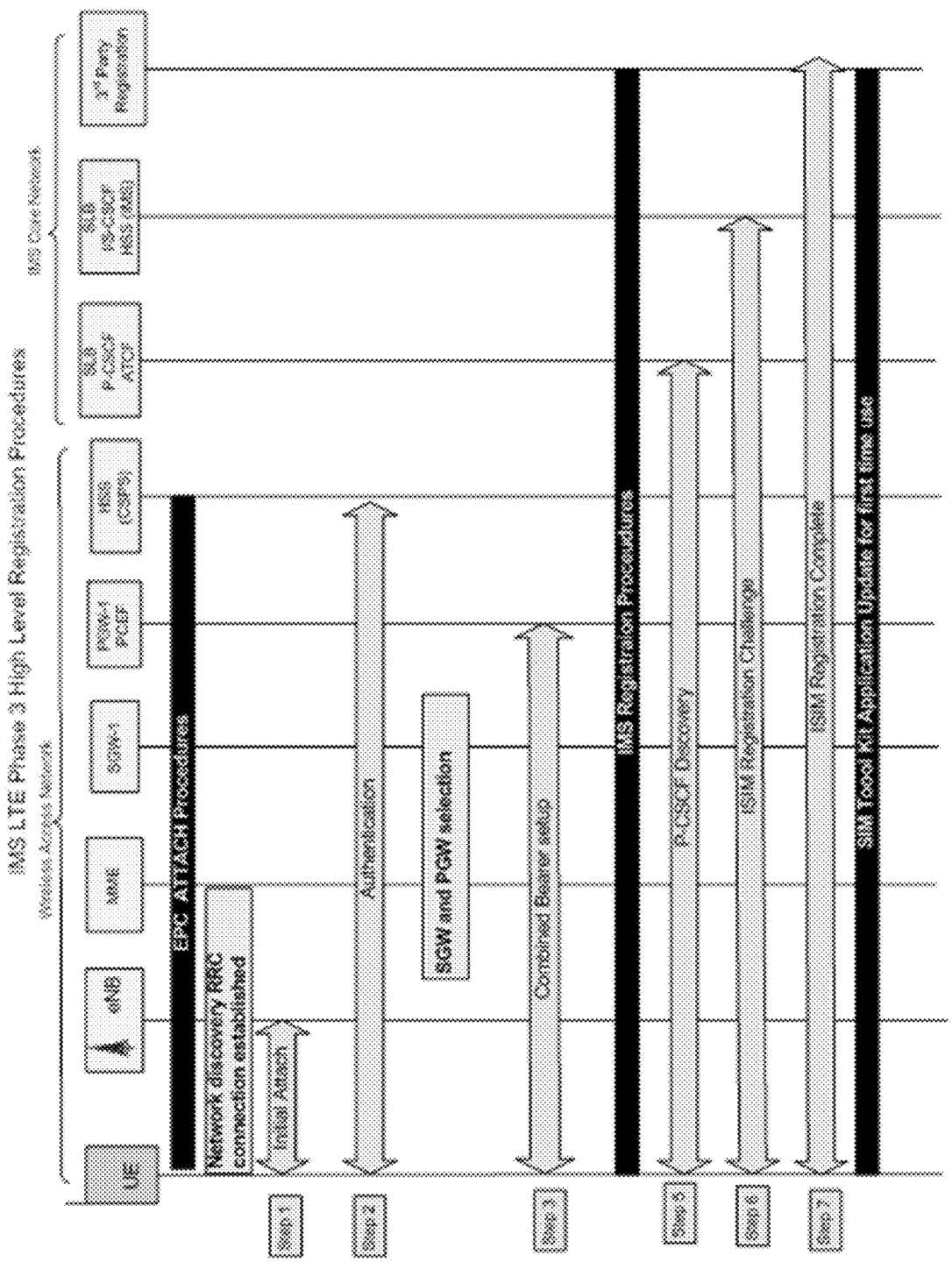
FIG. 1 depicts an illustrative embodiment of a user equipment (UE) initial attachment and IMS registration process.

The subject disclosure describes, among other things, illustrative embodiments for reattaching communication devices to rebalance a communication network as it grows. Other embodiments are described in the subject disclosure.

One embodiment of the subject disclosure includes a wireless communication device including a processor, and a memory that stores executable instructions. Responsive to executing the instructions the processor can perform operations initiating communications with a session border controller of a communication network, receiving from the communication network a request to reattach to the communication network, and postponing a process for releasing bearer communications with the communication network responsive to detecting an active communication session initiated by the wireless communication device by way of the session border controller and determining that the request to reattach to the communication network is not urgent.

One embodiment of the subject disclosure includes a machine-readable storage medium including executable instructions that, when executed by a processor, facilitate performance of operations including receiving a request to reattach to a communication network to update a registration between a communication device and the communication network while the communication device is connected to a session border controller of the communication network, and postponing a process, by the communication device, for releasing bearer communications with the communication network responsive to determining that the request to reattach to the communication network is not urgent.

One embodiment of the subject disclosure includes a method for receiving, by a communication device, a request to update a registration between the communication device and a communication network without causing the communication device to cycle power or reset, and postponing, by the communication device, a process for releasing bearer communications with the communication network responsive to determining that the request to update registration between the communication device and the communication network can be delayed.

One embodiment of the subject disclosure includes a method for detecting, by a controller, an addition of a plurality of networking devices on a communication network; and providing, by the controller, a request to a plurality of communication devices to update a registration between the plurality of communication devices and the communication network without causing the plurality of communication devices to cycle power or reset to cause a portion of the plurality of communication devices to register with a portion of the plurality of networking devices. In one embodiment, the plurality of communication devices can be configured to postpone a process for releasing bearer communications with the communication network responsive to determining that the request to update registration can be delayed.

One embodiment of the subject disclosure, involves causing Voice over Long Term Evolution (VoLTE) user equipment (VoLTE UE) of a VoLTE network to reattach to Evolved Packet Core (EPC) and the IP Multimedia Subsystem (IMS) networks. Reattachment of the VoLTE UE can be used to address a number of operational and engineering issues. For example, it may be necessary to force a VoLTE UE to reattach to rebalance registered users across a current IMS Session Border Controller (SBC), core Serving-Call Session Control Function (S-CSCF) equipment, and/or core Proxy-Call Session Control Function (P-CSCF) equipment. Reattachments can also be useful for SBC/P-CSCF Virtual Network Functions (VNFs) which may be instantiated, or "spun-up," in an IMS network to augment or grow the access network capacity of the IMS network. Reattachments can also be used to address UE network connectivity issues.

Prior art systems can cause a VoLTE UE to reattach to a network in a manner that can cause network overloads and can be disruptive to usage of a VoLTE UE by a subscriber. For example, some prior art systems perform a reattachment to a network by requiring a VoLTE UE to power-cycle. This technique is not desirable especially when thousands or millions of VoLTE UEs are forced to power-cycle at nearly the same time to invoke a reattach process. Other prior art systems require that the EPC's IMS Access Point Name (APN) be taken out-of-service, or "bounced," at the EPC's Packet Data Network Gateway (PDN-GW) which forces VoLTE UEs to reattach regardless of whether they are currently active on a call. Disrupting a call or data session would be undesirable to subscribers of VoLTE UEs, especially during an emergency 911 call. Forced reattachments such as those described above can also cause a large number of VoLTE UEs to reattach simultaneously resulting in a network overload.

Figure 2:
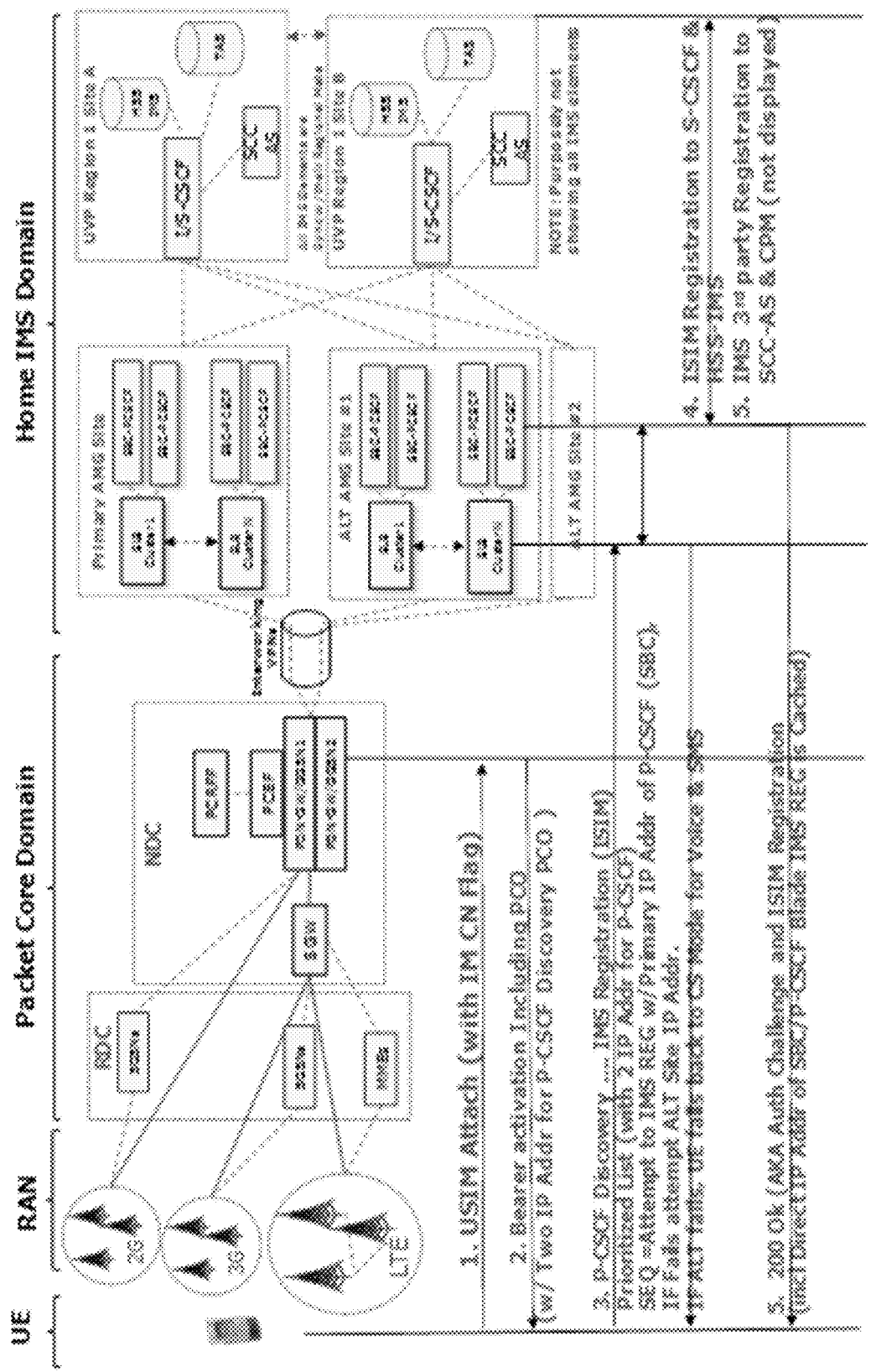
FIG. 2 depicts an illustrative embodiment of a UE interface to a Evolved Packet Core (EPC) network and IMS core network.

It is therefore desirable that the reattachment of a VoLTE UE to the EPC and the IMS core networks have a reduced adverse impact (or no impact at all) to a user of the VoLTE UE or the EPC and IMS networks. In one embodiment, this can be accomplished with a reattach procedure that causes a VoLTE UE to release its dedicated bearers with the EPC, which releases its associated relationship and with the EPC and an SBC/P-CSCF of the IMS core network. After releasing the dedicated bearers, the VoLTE UE can perform an initial attach and authentication with the EPC to establish LTE bearers to communicate with the EPC over a Radio Access Network (RAN). Following an attach and authentication process, the VoLTE UE can perform Proxy-CSCF (P-CSCF) Discovery and IMS registration to connect the VoLTE UE to the IMS SBC/P-CSCF and the IMS network. At that time, the VoLTE UE can obtain new SBC/P-CSCF IP addresses from the Packet Data Network Gateway (PDN-GW) using a Protocol Configuration Option (PCO) method (described in 3GPP 24.229 3GPP 24.008 and 3GPP 29.061). FIGS. 1-2 depict illustrative embodiments of a VoLTE UE initial attach and IMS registration steps, and connectivity to the EPC and IMS core, respectively.

Following the VoLTE UE reattach process described above, depending upon the P-CSCF IP addresses returned in the PCO method, the VoLTE UE would now be attached to a new SBC/P-CSCF georedundant pair and associated IMS core pairs. Thus after the reattachment described above, VoLTE UEs can be rebalanced onto a new SBC/P-CSCF and IMS core. Once the VoLTE UE is provided the IP addresses of the SBC/P-CSCF, typically a primary and secondary SBC/P-CSCF, it can retain those addresses unless the VoLTE UE either is power-cycled by the user or loses connectivity.

Typically, a VoLTE UE, once attached to the EPC and IMS networks, rarely reattaches. This is because many users of smartphones (tablets and computers and other similar communication devices) do not power-cycle their phones, and with widespread LTE coverage, do not lose network connectivity. Consequently, as additional SBC/P-CSCFs are added in the network to grow capacity, there will be an imbalance in how VoLTE UEs utilize the available SBC/P-CSCF capacity of the network. This is because the new VoLTE UEs that attach to the network are provided IP addresses of the SBC independent of the current VoLTE UEs that are registered through them, typically provided on a round-robin basis to the attaching VoLTE UEs. Therefore, even though there may be new SBCs available to provide new capacity to VoLTE UEs, there's an equal chance that the existing SBCs will have the new VoLTE UEs registered to them causing a capacity imbalance and eventual overload in the IMS network. This issue is illustrated in FIG. 3.

Figure 3:
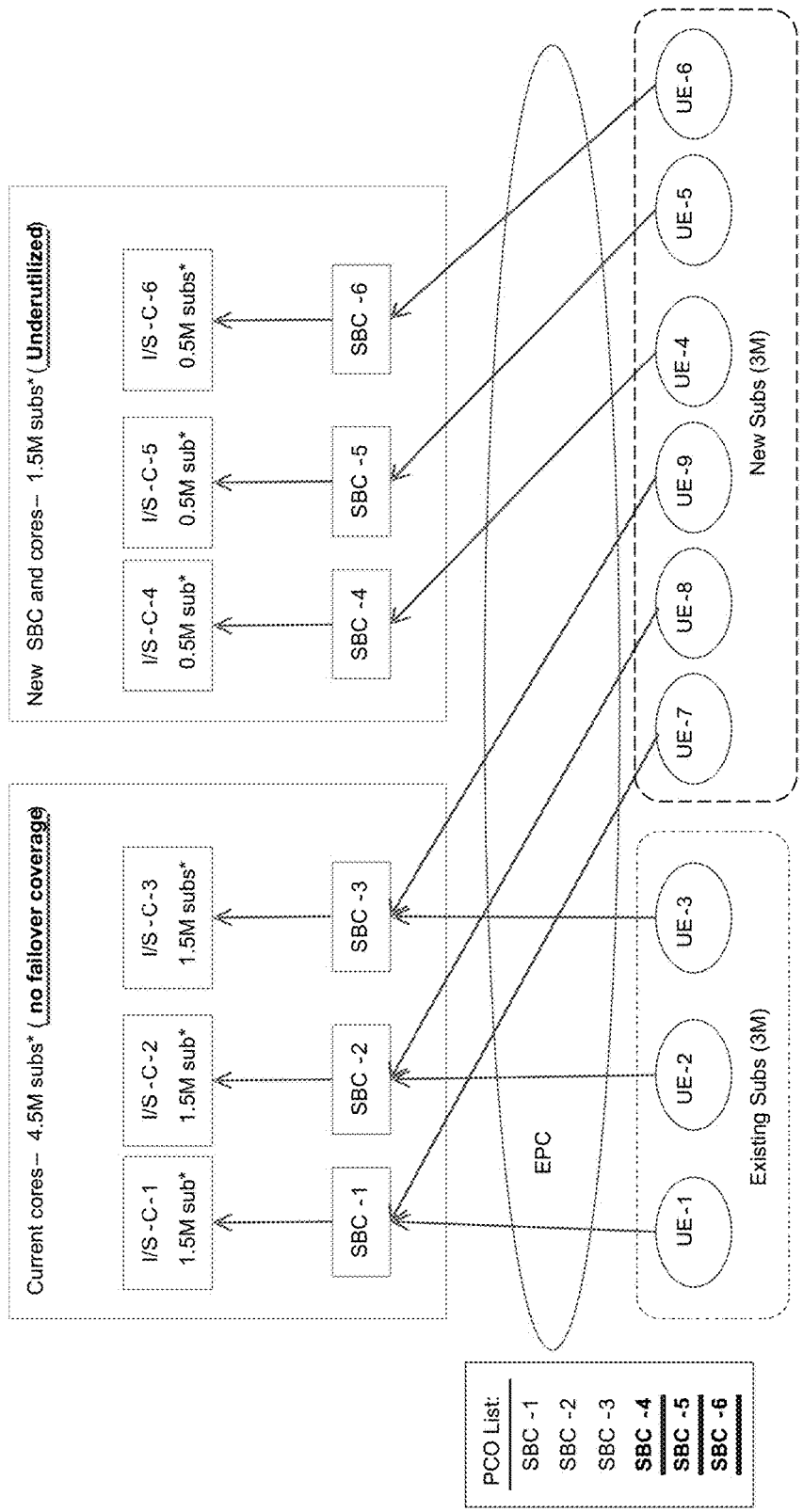
FIG. 3 depicts an illustrative embodiment of a UE network imbalance due to network growth.

FIG. 3 demonstrates that as new SBC's are added to an IMS network, new VoLTE UEs registrations will recognize the new SBC's but VoLTE UEs that have not re-registered will remain with the SBC's they were previously registered to resulting in an imbalance. In the example illustrated in FIG. 3, suppose 3M VoLTE UEs were registered to SBCs 1-3, and SBCs 4-6 have been added to the IMS network. Further suppose 3M new VoLTE UEs need to register with the IMS network. Based on a round-robin assignment process, SBCs 1-3 will pick up 1.5M additional of the new VoLTE UEs, while SBC 4-6 will pick up the remaining 1.5M new VoLTE UEs, thereby resulting in an imbalance of 4.5M VoLTE UEs registered to SBCs 1-3 and 1.5M VoLTE UEs registered to SBCs 4-6. SBCs 4-6 would thus be underutilized, while SBCs 1-3 may exceed engineered capacity.

To resolve the imbalance depicted in FIG. 3, a VoLTE UE reattach process can be implement by way of an application in the VoLTE UE that is accessible only by a network operator. The application can be configured to be secure from non-operator access and operation. The application can be installed on the VoLTE UE either by an original equipment manufacturer (OEM), per network operator requirements, or by the network operator by way of a download to the VoLTE UE either at the point-of-sale or by software updates made to the VoLTE UE via an over-the-air download or tethered download. The application can be configured to allow the operator to set a number of characteristics to invoke the VoLTE UE reattach. For example, some of the characteristics can include, but are not limited to: (a) day and time to invoke the reattach, (b) randomization window around the day/time to invoke the reattach to prevent registration storms and resulting network impacts, (c) graceful reattach to wait for any current calls or internet sessions in-progress to complete prior to the reattach, and/or (d) emergency, or urgent, reattach to invoke the reattach regardless of communication sessions in-progress. The application can also be configured to execute at certain times with a low frequency of executions to avoid degrading a VoLTE UE's performance or battery life.

The operator can utilize a server or other suitable computing equipment to adjust the above characteristics or settings in the application. The adjustments made by the operator to the application once installed in a VoLTE UE can also be performed by an over-the-air download, a tethered internet-based download, or a manual update on the VoLTE UE. The operator can be provided the ability to broadcast reattach requests for a set number of VoLTE UEs or control individually whether a single VoLTE UE should reattach. In one embodiment, an initiation of a VoLTE UE reattach may be either under the control of operations personnel via, for example, a Controller Operations Support System (C-OSS) or a cloud network orchestrator communicating to the C-OSS. The C-OSS can be used automatically, for example, in response to network growth of SBC/P-CSCF Virtual Network Functions (VNFs) in the cloud access network. In addition, the C-OSS can be configured to enable an operator to monitor whether the operation to reattach a VoLTE UE was successful by receiving an acknowledgment or telemetry data from the application and/or the SBC/P-CSCFs in the IMS network.

Figure 4:
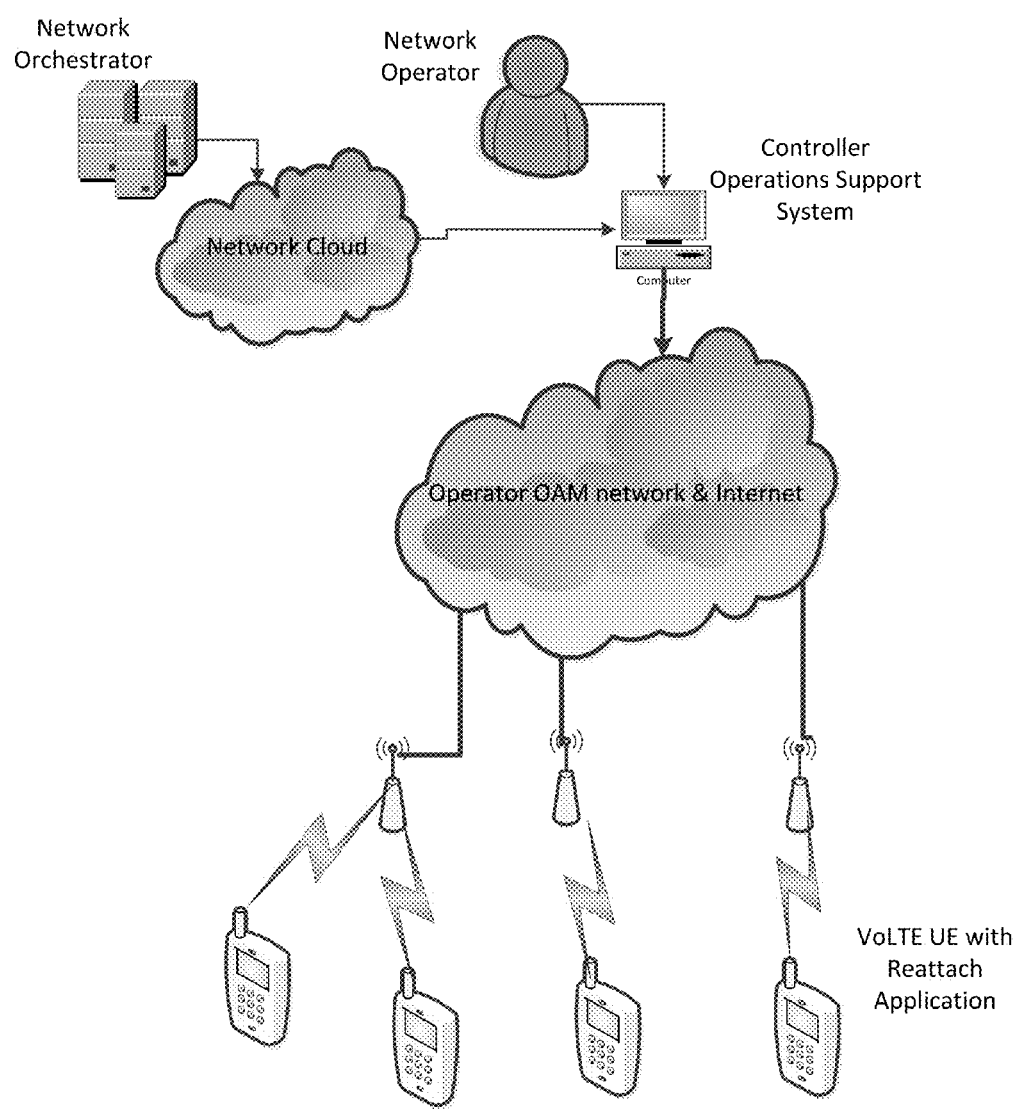
FIG. 4 depicts an illustrative embodiment of a macro view of a UE reattachment application.

FIG. 4 depicts an illustrative embodiment of a macro view of a system VoLTE UEs for performing a reattachment. In the illustration of FIG. 4, a C-OSS can serve as a network operations support system under control of the network operator for selecting one or more VoLTE UEs, setting attributes in the one or more VoLTE UEs reattach application, communicating with the reattach application in the one or more VoLTE UEs and monitoring the status (success or failure) of the one or more VoLTE UE reattach procedure. The C-OSS can be controlled by network operations personnel or by another server such as a cloud network orchestrator. The cloud network orchestrator can, for example, automatically request the C-OSS to initiate a request for VoLTE UE reattach applications in response to network growth of SBC/P-CSCF Virtual Network Functions (VNFs) in the Network Cloud. This enables the network to dynamically be rebalanced from a capacity engineering perspective in response to dynamically adding SBC/P-CSCF virtual network function capacity.

The C-OSS can have a database of contact information or IP addresses of VoLTE UE reattach applications in relation to a Network Data Center EPC P-GW and SBC/P-CSCF. In addition, the C-OSS can contain defaults for the VoLTE UE reattach application. The C-OSS can communicate securely with the VoLTE UE reattach application (using encryption methods, VPNs, PKI or other suitable methods) to ensure that only the network operator can control and receive reports from the reattach application. The C-OSS can broadcast to a set of VoLTE UE reattach applications or send individual requests to invoke the reattach application. In addition, the C-OSS can be configured to obtain reports back from the reattach applications of VoLTE UEs to determine the success or failure of the VoLTE UEs performing the reattach, the SBC/P-CSCFs to which they are attached, and/or other statistics related to the reattach application, e.g., registration state of VoLTE UEs. The C-OSS can further associate this data with VoLTE UE subscribers to determine the performance and engineering or load balancing in the network.

Figure 5:
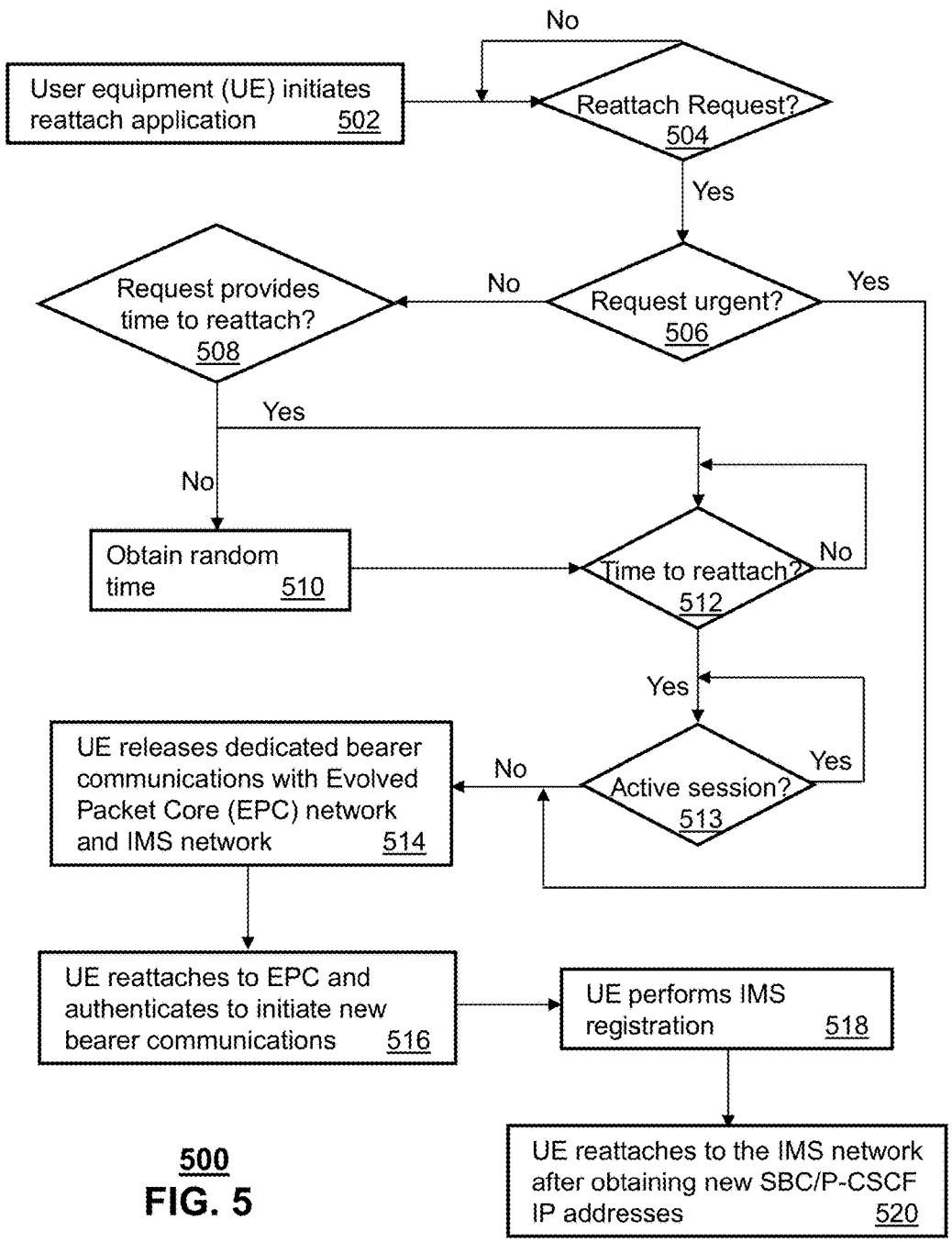
FIG. 5 depicts an illustrative embodiment of a method for reattaching a UE to EPC and IMS core networks.

FIG. 5 depicts an illustrative embodiment of a method 500 for reattaching a VoLTE UE to EPC and IMS core networks in accordance with the block diagrams of FIGS. 1-2 and 4. At step 502, a VoLTE UE can be configured to initiate a software application which can be embedded in a VoLTE UE's internal memory or a Universal Integrated Circuit Card (UICC), such as a SIM card. The software application (which is for convenience, referred to herein as an "application") can be securely stored in a tamper resistant UICC or other type of memory of the VoLTE UE. In one embodiment, the application can operate as a background process that is awakened at a periodic time, or executed from a cold start. The frequency of execution of the application at step 502 can be configured by an operator as described above so that VoLTE UE does not degrade battery life. Once initiated, the application can in one embodiment facilitate the establishment of communications with the C-OSS (or the network orchestrator) of FIG. 4 to determine at step 504 whether a reattach request has been invoked by the C-OSS. In another embodiment, the VoLTE UE can receive a reattach request from the C-OSS over a secure communications interface and store the reattach request in memory. When the application is invoked at step 502, the application can check memory for a reattach request. Other embodiments for determining whether a reattach request is present at step 504 can be used in the subject disclosure. For example, a flag can be set by the C-OSS in a memory of the VoLTE UE to identify a reattach request.

Once a reattach request is detected at step 506, the application can determine at step 506 whether the reattach request is urgent. The C-OSS, for example, can provide urgent versus regular reattach requests to the VoLTE UE. The reattach requests can be distinguished by a code provided in the request, or other suitable information (e.g., setting of a flag in a binary string included in the request). If the reattach request is urgent (or an emergency), the application of the VoLTE UE can proceed to step 514. In one embodiment, at step 514, the VoLTE UE can be configured to promptly initiate the reattach process. In an alternate embodiment, at step 514, the VoLTE UE can be configured to initiate the reattach process at a random time to further randomize the reattach process by multiple VoLTE UEs. At step 514, the VoLTE UE can begin the reattach process by releasing dedicated bearers with the EPC, which in turn releases its associated relationship and with the EPC and IMS SBC/P-CSCF of IMS core network. At step 516, the application can perform an initial attach and authentication with the EPC to initiate LTE bearers to communicate with the EPC over a RAN such as shown in FIGS. 1, 2 and 4. Following an attach and authentication process, the application of the VoLTE UE can at step 518 perform P-CSCF Discovery and IMS registration to connect the VoLTE UE to the IMS SBC/P-CSCF and the IMS network. At that time, the VoLTE UE can obtain at step 520 new SBC/P-CSCF IP addresses from the PDN-GW using a PCO method.

Referring back to step 506, if the reattach request is not urgent, the application of the VoLTE UE can proceed to step 508. At this step, the application can determine if the reattach request provides a time supplied by the C-OSS to initiate the reattachment process. If a time is provided, the application can proceed to step 512 where the application determines whether the time prescribed by the C-OSS has occurred. If not, the application waits until the time provided by the C-OSS occurs. When the time occurs, the application of the VoLTE UE proceeds to step 513 to determine if an active communication session is present (e.g., voice and/or real-time or non-real-time data session). If an active communication session is detected, the application postpones the reattach process. Once the active communication session terminates, the application proceeds to steps 514 through 520 as previously described.

If a time is not provided by the C-OSS in the reattach request, the application can proceed to step 510 where it obtains a random time to initiate the reattachment process. The application can use a random time generator embedded in the VoLTE UE to obtain this time, or it can obtain the random time from a remote time generator operating in a communication network (e.g., from the RAN, the C-OSS or any other network node). Once a random time has been obtained, the application can proceed to step 512 to initiate the reattachment process of steps 514 through 520 when the random time occurs and no active communication sessions are detected at step 513.

Method 500 provides among other things the benefit of rebalancing VoLTE UEs as a network grows without causing registration storms and without the need to power cycle VoLTE UEs or interrupting active communication sessions. For instance, method 500 provides operators flexibility to selectively choose VoLTE UEs to be reattached and for setting parameters such as time to initiate reattachment of VoLTE UEs. Method 500 also enables VoLTE UEs to initiate reattachments at random times to prevent overburdening the network with registration storms. Method 500 also provides operators the ability to perform prompt reattachments by sending emergency or urgent reattachment requests.

Figure 6:
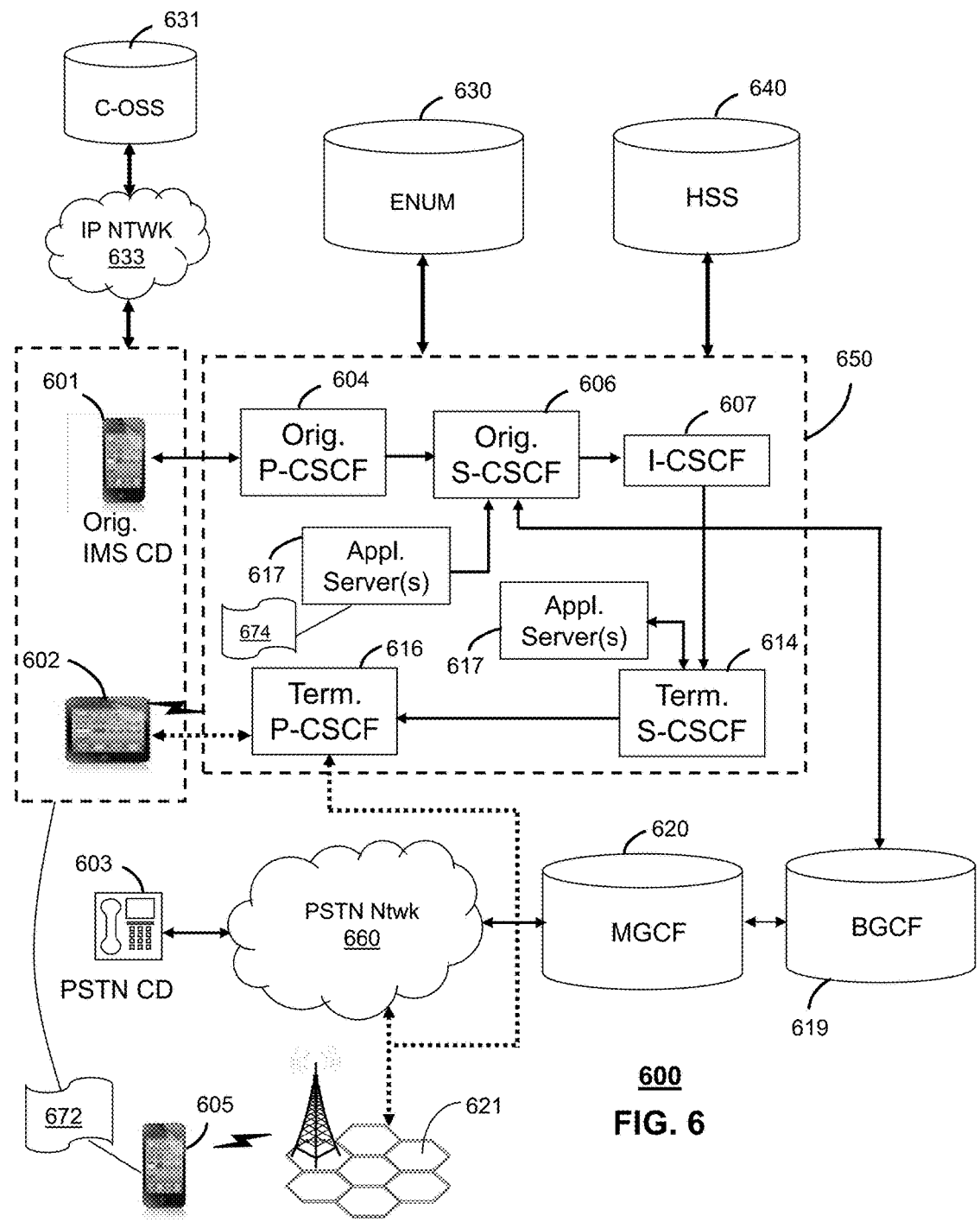
FIG. 6 depicts an illustrative embodiment of an IMS network.

FIG. 6 depicts an illustrative embodiment of a communication system 600 employing an IMS network architecture to facilitate the combined services of circuit-switched and packet-switched systems. Communication system 600 can be configured to perform the processes described by method 500. For example, the C-OSS, depicted by reference 631 in FIG. 6, can communicate with communication devices 601, 602 and 605 by way of a IP-based network 633 over a secure channel (e.g., a VPN) to instruct a reattach software application (depicted as function 672) operating in the communication devices 601, 602 and 605, to perform the steps of method 500. Although FIG. 6 shows only P-CSCFs, it should be assumed that these designations also include corresponding session border controllers (SBCs). Accordingly, when method 500 is invoked by communication devices 601, 602 and 605, communication devices 601, 602 and 605 will reattach to new and legacy SBC/P-CSCF pairs of the IMS network 650 as described by method 500. What follows below is an overview of the process for initiating a communication session from an originating device to a terminating device. The processes of method 500 are assumed to take place at appropriate times for initiating reattachments to address changes (e.g., new SBC/P-CSCF pairs) in the IMS network 650.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
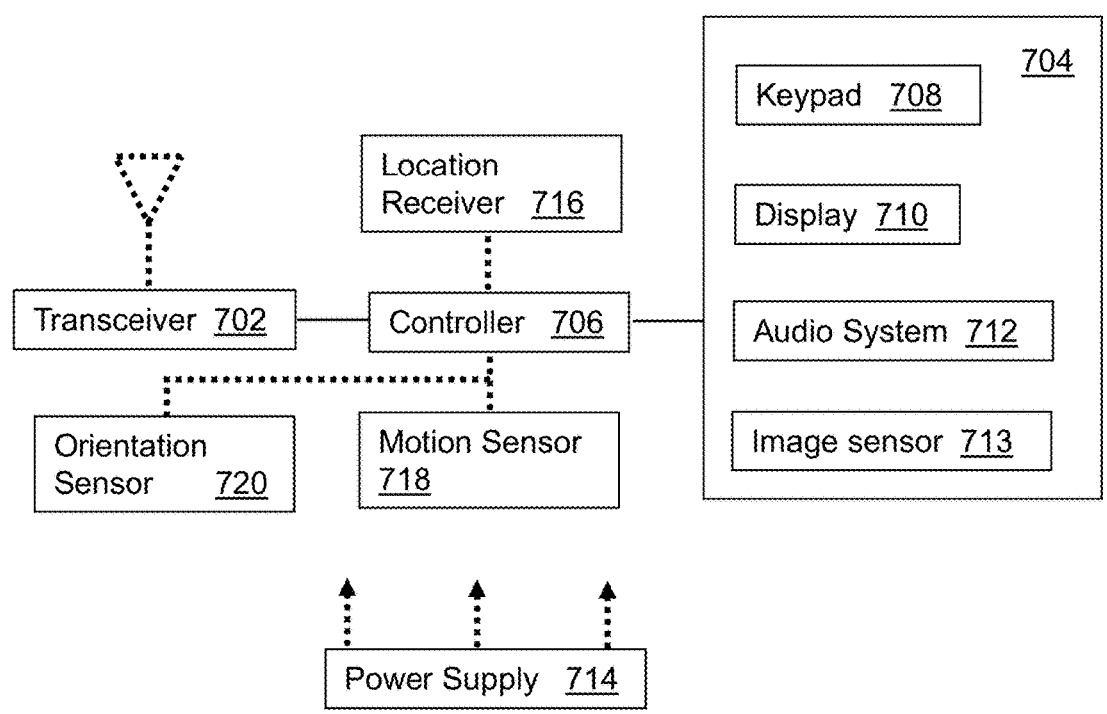
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-4 and 6 and can be configured to perform the processes of method 500 of FIG. 5.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

Upon reviewing the aforementioned embodiments, it would be evident to an artisan with ordinary skill in the art that said embodiments can be modified, reduced, or enhanced without departing from the scope of the claims described below. For example, the application of the VoLTE UE described above can be implemented as a statement machine via an Application Specific IC (ASIC). The application described above can be performed by 3G, next generation 4G or future generations of a communication devices for addressing the addition of new network devices. Method 500 can be adapted for rebalancing communication devices registered to communication nodes added to a network other than an SBC or P-CSCF. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
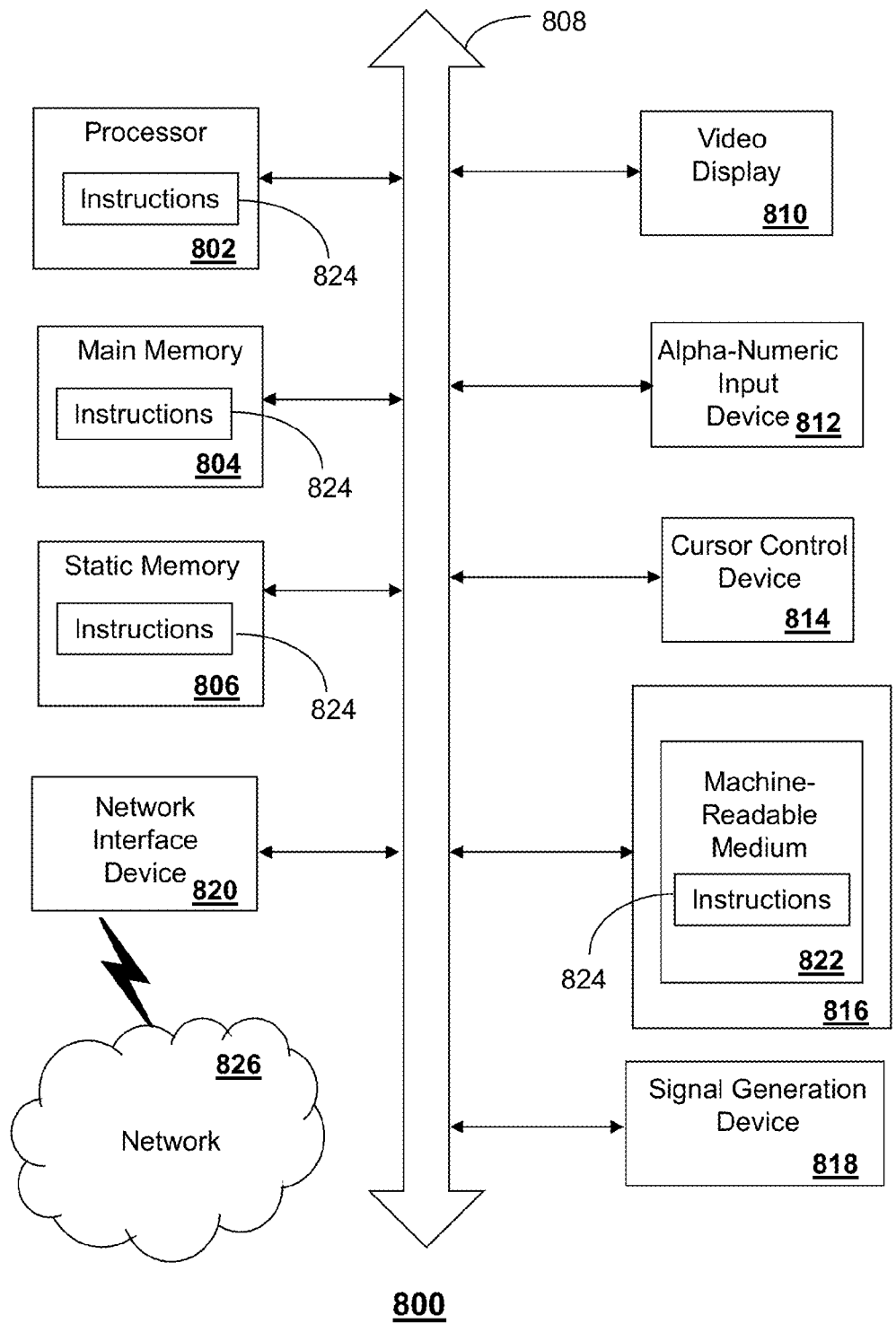
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the C-OSS, the VoLTE UEs, and other devices of FIGS. 1-4 and 6. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage medium, comprising executable instructions that, when executed by a processor, facilitate performance of operations, comprising:

receiving a request to reattach to a communication network to update a registration between a communication device and the communication network while the communication device is connected to a session border controller of the communication network; and postponing a process, by the communication device, for releasing bearer communications with the communication network responsive to determining that the request to reattach to the communication network is not urgent.

2. The machine-readable storage medium of claim 1, wherein the postponing is further responsive to detecting an active communication session initiated by the communication device via the session border controller.

3. The machine-readable storage medium of claim 1, wherein the operations further comprise obtaining a random time and initiating the process for releasing bearer communications with the communication network at the random time.

4. The machine-readable storage medium of claim 1, wherein the operations further comprise initiating the process for releasing bearer communications with the communication network at a time provided in the request.

5. The machine-readable storage medium of claim 1, wherein the operations further comprise initiating the process for releasing bearer communications with the communication network at a time provided in the request supplied by the communication network.

6. The machine-readable storage medium of claim 1, wherein the operations further comprise initiating a process for attaching to a different session border controller selected by the communication network.

7. The machine-readable storage medium of claim 1, wherein the operations further comprise obtaining from the communication network identifying information for a new session border controller that differs from the session border controller previously assigned to the communication device.

8. A method, comprising:
   detecting, by a wireless communication system operating from a processing system including a processor, a request to reattach to a communication network to update a registration between a communication device and the communication network while the communication device is connected to a session border controller of the communication network; and
   postponing, by the processing system, a process that releases bearer communications of the communication device with the communication network responsive to a determination that the request to reattach to the communication network is not urgent.

9. The method of claim 8, wherein the postponing is further responsive to detecting, by the processing system, an active communication session initiated by the communication device via the session border controller.

10. The method of claim 8, further comprising:
    obtaining, by the processing system, a random time and initiating the process for releasing bearer communications with the communication network at the random time.

11. The method of claim 8, further comprising:
    initiating, by the processing system, the process that releases bearer communications with the communication network at a time provided in the request.

12. The method of claim 8, further comprising:
    initiating the process for releasing bearer communications with the communication network at a time provided in the request supplied by the communication network.

13. The method of claim 8, further comprising:
    initiating a process for attaching to a different session border controller selected by the communication network.

14. The method of claim 8, further comprising:
    obtaining from the communication network identifying information for a new session border controller that differs from the session border controller previously assigned to the communication device.

15. A system, comprising:
    a processor; and
    a memory that stores executable instructions that, when executed by the processor, facilitate performance of operations, comprising:
      detecting a request to reattach to a communication network to update a registration between a wireless communication system and the communication network while the wireless communication system is connected to a session border controller of the communication network; and
      delaying a release of bearer communications with the communication network responsive to the request to reattach to the communication network not being urgent.

16. The system of claim 15, wherein the delaying is further responsive to detecting an active communication session initiated by the wireless communication system via the session border controller.

17. The system of claim 15, wherein the operations further comprise obtaining a random time and initiating the process for releasing bearer communications with the communication network at the random time.

18. The system of claim 15, wherein the operations further comprise initiating the process for releasing bearer communications with the communication network at a time provided in the request.

19. The system of claim 15, wherein the operations further comprise obtaining from the communication network identifying information for a new session border controller that differs from the session border controller previously assigned to the wireless communication system.

20. The system of claim 19, wherein the session border controller is paired with a second session border controller to form a first georedundant pair of session border controllers, wherein the new session border controller is paired with a third session border controller to form a second georedundant pair of session border controllers, and wherein the operations further comprise initiating an attachment to the second georedundant pair of session border controllers.

\* \* \* \* \*